UNITED STATES PATENT OFFICE 2,384,306

ESTERS OF HALONITROPHENOLS

William F. Hester, Drexel Hill, and W E Craig, Philadelphia, Pa., assignors to Röhm & Haas Company, Philadelphia, Pa., a corporation of Delaware No Drawing. Application November 19, 1940, Serial No. 366,259

2 Claims. (Cl. 167—30)

This invention relates to insecticidal compositions containing as an active insecticidal agent a compound of the formula

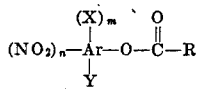

wherein Ar is an aryl nucleus selected from a member of the benzene and naphthalene series, X is a halogen, Y is a member of the group consisting of hydrogen and hydrocarbon groups, R is a radical from a carboxylic acid, $n$ is an integer having a value from one to two inclusive, and $m$ is a small integer. Typical groups represented by Y include methyl, ethyl, propyl, isopropyl, ter. butyl, allyl, methallyl, amyl, hexyl, capryl, octyl, undecenyl, dodecyl, octadodecenyl, octadecyl, phenyl, methylphenyl, benzyl, chlorobenzyl, cyclohexyl, etc. Typical of the groups represented by R are the radicals from organic acids aside from the —COOH group, of the aliphatic, aromatic, arylaliphatic, cycloaliphatic, and heterocyclic series, such as acetic, chloroacetic, bromoacetic, propionic, butyric, isobutyric, capric, crotonic, undecylenic, furoic, lauric, stearic, oleic, ricinoleic, succinic, sebacic, fumaric, benzoic, caprylthioacetic, butoxyacetic, caproxybutyric, phenoxyacetic, caprylphenoxyacetic, cyclohexyloxyacetic, chlorobenzoic, salicylic, benzoylbenzoic, naphthylacetic, naphthenic, campholic, abietic, etc., or from commercial mixtures of acids, including fatty acids from glycerides, acids from the oxidation of petroleum oil, long chain organic acids recovered in paper manufacture (sold under the trade names of "Talloil," "Indusoil," etc.).

While the nitrophenolic esters have fair insecticidal value, it has been found that the introduction of a halogen such as chlorine or bromine into the nitroaryl nucleus increases the insecticidal activity. At the same time phytocidal activity does not increase. The presence of the ester group, furthermore, seems to prevent interference with the development and normal cycle of plants and prevents the compound from causing metabolic or physiological disturbances. In contrast to many aromatics having halogen and nitro substituents the esters of halonitrophenols have not caused discomfort to workers using them.

The carboxylic acid esters of halonitrophenols may be prepared by nitrating and halogenating a phenol or a hydrocarbon-substituted phenol, followed by esterification. For this last step a metal salt of the substituted phenol may be treated with a monocarboxylic anhydride or an acyl halide. Other methods of preparation are known including the reaction of a phenol with an anhydride or acid halide, particularly in the presence of pyridine. Preparation of typical compounds is described in the following examples.

Example 1

A mixture of 137 parts of 2-bromo-4-ter. butyl-6-nitrophenol (melting at 72° C.) and 137 parts of acetic anhydride was stirred and heated under reflux for two hours and concentrated to 159 parts by evaporation. This concentrate was dissolved in petroleum ether, washed with 500 parts of 2 N sodium hydroxide solution to remove unreacted phenol, dried with calcium chloride, and heated to drive off volatile materials, leaving 134 parts of product which solidified on cooling. The solid, twice crystallized from methanol, melts at 53–54° C., and corresponds in composition to

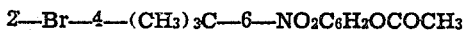

2—Br—4—(CH₃)₃C—6—NO₂C₆H₂OCOCH₃

Example 2

2-chloro-4-ter. butyl-phenol was nitrated in acetic acid at 20–30° C. to give

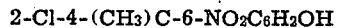

2-Cl-4-(CH₃)C-6-NO₂C₆H₂OH a yellow solid melting at 73.5° C. This was quantitatively converted to the corresponding acetate by the method of Example 1. The product, crystallized from methanol, consisted of light yellow crystals, melting at 57° C., having the composition

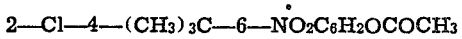

2—Cl—4—(CH₃)₃C—6—NO₂C₆H₂OCOCH₃

Example 3

A mixture of 59.5 parts of 2,4-dibromo-6-nitrophenol, 49.5 parts of the acid chloride of a commercial cocoanut fatty acid having an acid number of .265, 24 parts of pyridine, and 160 parts of ethylene chloride was stirred and heated under reflux for four and a half hours. The reaction mixture was cooled, washed with 2 N hydrochloric acid, washed with three small portions of 2 N sodium hydroxide, washed with water, dried over calcium chloride, and heated to evaporate volatile materials, leaving 69.5 parts of a clear brown oil, which is essentially

2,4—Br₂—6—NO₂C₆H₂OCOC₁₁H₂₃

Example 4

A mixture of 32.7 parts of 2-nitro-4-bromophenol and 32.7 parts of acetic anhydride together with a small amount of concentrated sulfuric acid was stirred and heated under reflux for one and three-quarters hours. The reaction mixture was cooled, diluted with water, and neutralized with 2 N sodium hydroxide solution. A solid slowly separated, which was removed, and dissolved in benzene. The benzene solution was washed with water and concentrated to give 39 parts of a solid product which, upon crystallization from ethanol, melts at 74° C. and corresponds to 2—NO₂—4—BrC₆H₃OCOCH₃

Example 5

Following the procedure of Example 4, 50 parts of 2,6-dinitro-4-chlorophenol was acetylated and the product crystallized from a mixture of alcohol and acetone to give 47.5 parts of a crystalline material melting at 110–111° C. and corresponding in composition to 2,6—(NO₂)₂—4—ClC₆H₂OCOCH₃

By generally similar procedures there may be prepared esters of such phenols as 2,4,6—Br₃—3,5—(NO₂)₂C₆OH
6—I—2—NO₂C₆H₃OH
4—I—3—NO₂C₆H₃OH
2—I—4—NO₂C₆H₃OH
2,6—I₂—4—NO₂C₆H₂OH
4—I—2,3—(NO₂)₂C₆H₂OH
4—F—2—NO₂C₆H₃OH
4—Cl—6—I—2—NO₂C₆H₂OH
4—Br—6—I—2—NO₂C₆H₂OH
4—F—2,6—(NO₂)₂C₆H₂OH
2—Br—4—C₈H₁₇—6—NO₂C₆H₂OH
2,4—Br₂—6—NO₂C₆H₂OH
4—Br—6—Cl—2—NO₂C₆H₂OH
6—Br—2—NO₂—4—C₆H₅CH₂—C₆H₂OH
2—Br—6—NO₂C₁₀H₅OH—1
6—Br—1—NO₂C₁₀H₅OH—2
3,6—Br₂—1—NO₂C₁₀H₄OH—2
3,4,6—Br₃—1—NO₂C₁₀H₃OH—2
1—CH₃—6—Br—3—NO₂C₁₀H₄OH—2.

Other typical halonitrophenyl esters are given below:

2—Br—4—(CH₃)₃CCH₂(CH₃)₂C—6—
 NO₂C₆H₂OCOCH₃
2—Br—4—C₂H₅(CH₃)₂C—6—NO₂C₆H₂OCOC₂H₅
4—Br—2—C₆H₁₃CH(CH₃)—6—NO₂C₆H₂OCOCH₃
2—Br—4—(CH₃)₃C—6—NO₂C₆H₂OCOC₁₁H₂₃
2—Cl—4—(CH₃)₃C—6—NO₂C₆H₂OCOC₁₁H₂₃
6—Br—2,4—(NO₂)₂C₆H₂OCOC₅H₁₁
6—Br—4—(CH₃)₃C—2—NO₂C₆H₂OCOC₅H₁₁
6—Cl—4—(CH₃)₃C—2—NO₂C₆H₂OCOC₅H₁₁
2,4—Br₂—6—NO₂C₆H₂OCOCH₃
2,6—Br₂—4—NO₂C₆H₂OCOCH₃
2—C₆H₁₃CH(CH₃)—4—Cl—6—NO₂C₆H₂OCOCH₃
2—Cl—4—(CH₃)₃CCH₂(CH₃)₂C—6—
 NO₂C₆H₂OCOCH₃
4—Br—2—NO₂C₁₀H₅OCOC₃H₇
4—I—2—NO₂C₁₀H₅OCOC₂H₅
6—Br—1—NO₂C₁₀H₅OCOC₆H₅—2
(2—Br—4—(CH₃)₃C—6—NO₂C₆H₂OCOCH₂—)₂
(2—Cl—4—(CH₃)₃C—6—
 NO₂C₆H₂OCOCH₂CH₂CH₂CH₂—)₂
(6—Br—2,4—(NO₂)₂C₆H₂OCOCH₂CH₂—)₂, etc.

When compounds of the type herein described are used as insecticides, they may be applied in the form of solutions in organic solvents, in the form of emulsions in water, or in the form of dusts. The form of the preparation to be employed will depend primarily upon the type of insect or insects being combatted.

The form is also at times determined by use therewith of other insecticidal or fungicidal agents to give a plurality of effects or a single improved effect. The halonitrophenolic esters may be used in conjunction with such toxicants as rotenone, pyrethrins, nicotine, organic thiocyanates, arsenates, oils from petroleum, tar, or animal or vegetable origin, copper compounds, etc. The mixtures with such toxicants may likewise be applied in the forms described above.

A useful form of horticultural spray for combatting soft-bodied or sucking insects, such as aphids, may be prepared by dissolving a halonitrophenolic ester in an organic solvent which is safe on plants, and emulsifying the solution in water with the aid of a suitable emulsifying agent, such as a sulfonated oil or the reaction product of a polyglycerol and a fatty acid. One useful formula for emulsion sprays is as follows:

| | Parts |
|---|---|
| Toxicant | 1 |
| Pine oil | 2 |
| Emulsifying agent | 1 |

This gives a self-emulsifying preparation which may be mixed with water and is effective over a wide range of concentrations.

Various halonitrophenolic esters were used in such formulae and the preparations diluted with water to give a spray having one part of toxicant in 1600 parts of spray. These sprays, along with sprays containing for comparison esters lacking the halogen substituent, were applied to nasturtium plants infested with green aphids and the number of aphids killed after 24 hours was determined as follows:

| Compound | Percent kill |
|---|---|
| 2—Br—4—(CH₃)₃C—6—NO₂C₆H₂OCOCH₃ | 66 |
| 2—Cl—4—(CH₃)₃C—6—NO₂C₆H₂OCOCH₃ | 81 |
| 2,4—Br₂—6—NO₂C₆H₂OCOC₁₂H₂₅ | 62 |
| 4—Cl—2,6—(NO₂)₂C₆H₂OCOCH₃ | 90 |
| 2—NO₂—4—(CH₃)₃CC₆H₃OCOCH₃ | 31 |

Various compounds were likewise tested against red spiders on bean plants with the following results for sprays having one part of toxicant in 1600 of spray:

| Compound | Per cent kill |
|---|---|
| 2—Br—4—(CH₃)₃C—6—NO₂C₆H₂OCOCH₃ | 82 |
| 2—Cl—4—(CH₃)₃C—6—NO₂C₆H₂OCOCH₃ | 68 |
| 2,4—Br₂—6—NO₂C₆H₂OCOC₁₂H₂₅ | 91 |
| 4—Cl—2,6—(NO₂)₂C₆H₂OCOCH₃ | 98 |
| 2—NO₂—4—(CH₃)₃CC₆H₃OCOCH₃ | 27 |

When 2—Br—4—(CH₃)₃C—6—NO₂C₆H₂OCOCH₃ was used at a dilution of 1 to 1200 against red spiders, kills of 97% were obtained in a series of tests. The acetate of chloronitrocapryl phenol gave kills of 94% when used at 1:4000 in sprays against red spiders on beans.

Tests against red spiders were also performed with an aqueous combination spray having emulsified therein a preparation consisting of 10% of a halonitrophenyl ester, 35% of an emulsifier, 20% of ethylene chloride, and 35% of a light petroleum oil (viscosity 100, unsulfonated residue 84.9%). The dilutions were arranged to give the concentrations of halonitrophenyl ester shown in the following table and the diluted sprays applied to greenhouse roses infested with red spiders. Results were as follows:

| Compound | Dilution | Per cent kill |
|---|---|---|
| 2,4—$Br_2$—6—$NO_2C_6H_2OCOC_{11}H_{23}$ | 1:4000 | 94 |
| 2—Br—4—$(CH_3)_3C$—6—$NO_2C_6H_2OCOCH_3$ | 1:4000 | 86 |
| 2,4—$Br_2$—C—$NO_2C_6H_2OCOCH_3$ | 1:4000 | 99 |
| 4—Cl—2,6—$(NO_2)_2C_6H_2OCOCH_3$ | 1:4000 | 99 |
| Br—$NO_2$—2—$C_6H_{13}CH(CH_3)C_6H_2OCOCH_3$ | 1:4000 | 100 |

The halonitrophenolic esters may also be spread on powders and used in this form as dusts or sprays. One method for spreading the toxicants on powders comprises dissolving it in a volatile organic solvent, applying the solution to the powder, and evaporating the solvent while the mixture is stirred. If desired, a spreading agent may be incorporated in the mixture. Suitable solvents include acetone, methyl, ethyl, or propyl alcohol, ether, ethyl acetate, etc., while suitable inert carriers include talc, chalk, magnesium carbonate, magnesia, lime, alum sludge, walnut shell flour, silica, clays, etc. The powdered preparations useful as dusts may contain one-half to ten per cent. of active material.

Typical formulae for dusts are as follows:

A

| | Parts |
|---|---|
| Active ingredient | 1 |
| Spreader | 1 |
| Talc | 98 |

B

| | |
|---|---|
| Active ingredient | 3 |
| Alum sludge | 47 |
| Lime | 47 |
| Soya bean oil | 3 |

A similar preparation for use as an aqueous spray, particularly valuable against chewing insects, may be prepared according to the following formula:

| | Parts |
|---|---|
| Active ingredient | 1 |
| Magnesium carbonate | 2 |
| Spreading agent | 0.5 |
| Water | 96.5 |

A dust containing

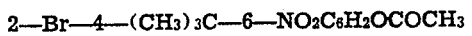

prepared according to Formula A was applied to bush bean plants and Mexican bean beetle larvae applied thereto. At the end of 24 hours 86% of the larvae were dead or so incapacitated that they could no longer feed.

We claim:
1. An insecticidal composition having as an active principle a compound of the formula

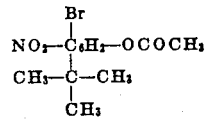

2. The process of controlling insects on living plants which comprises applying to plants an insecticidal composition containing as an active ingredient a compound of the formula

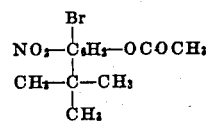

WILLIAM F. HESTER.
W E CRAIG.